United States Patent
Marsh et al.

[15] 3,663,304
[45] May 16, 1972

[54] IMMOBILIZED ELECTROLYTES FOR SECONDARY CELLS

[72] Inventors: Frederick Marsh; Kirk L. Thompson, both of Minneapolis, Minn.

[73] Assignee: Gould-National Batteries, Inc., St. Paul, Minn.

[22] Filed: July 2, 1969

[21] Appl. No.: 838,643

[52] U.S. Cl. ...............136/157, 23/105, 136/158, 252/317
[51] Int. Cl. .......................................H01m 9/02
[58] Field of Search.................136/6, 86, 158, 157, 153; 23/105; 252/317

[56] References Cited

UNITED STATES PATENTS

| 3,375,138 | 3/1968 | Mather | 136/86 |
| 3,408,233 | 10/1968 | Parker et al. | 136/153 |
| 3,556,860 | 1/1971 | Amlie | 136/157 |

OTHER PUBLICATIONS

Leicester, The Gelling of Concentrated Sulphuric Acid and Oleum, J. Soc. Chem. Inc. (London) 67, 433– 434 (1948)

*Primary Examiner*—Donald L. Walton
*Attorney*—Stryker and Jacobson

[57] ABSTRACT

A water activatable heat treated boron phosphate sulphuric acid gel suitable for use as an electrolyte precursor in a lead acid secondary cell.

16 Claims, No Drawings

IMMOBILIZED ELECTROLYTES FOR SECONDARY CELLS

This invention generally relates to secondary cells and more particularly, to water activatable immobilized electrolytes for use in lead acid secondary cells.

There presently are two major types of lead acid storage batteries on the market today. These are the "wet charged" and the "dry charged" batteries. The wet charged and dry charged batteries both have positive electrodes of lead peroxide and negative electrodes of sponge metallic lead. During shelf life the wet charged battery contains an aqueous sulphuric acid electrolyte in contact with the positive and negative plates, however, the dry charged battery, in contrast, does not have an aqueous electrolyte in contact with the positive and negative plates of the battery. Instead, the dry charged battery before activation either contains a sulphuric acid electrolyte in a separate container or in an immobilized state within the battery. Typically, to activate the latter type of dry charged battery, one pours water into the container which frees the sulphuric acid electrolyte.

The disadvantage of wet charged batteries is that they lose their capacity while standing and must either be recharged periodically or be continuously maintained on a trickle charge. This loss of capacity is compounded by the corrosion and sulphation of the plates within the cell which can shorten the life of the battery after it is placed in service. The use of a dry charged battery eliminates the problem of lost capacity as the sulphuric acid electrolyte does not contact the battery plates until the unit is ready to be placed in service. However, this dry charged type of battery has the disadvantage or the inconvenience of requiring a separate storing and handling of the container for the sulphuric acid unless the sulphuric acid electrolyte is immobilized. However, one of the problems with the existing immobilized electrolyte is the tendency for the immobilized electrolyte to exude liquid as it stands on the shelf. This phenomena is commonly called synersis. These droplets of liquid that form in the immobilized electrolyte contain concentrated sulphuric acid. If the concentrated sulphuric acid droplets contact the plates they corrode the plates resulting in premature failure of the battery.

A recent improvement in immobilized electrolytes has minimized the problem of synersis by gelation of sulphuric acid with boron phosphate. This is more fully shown and described in the copending application of Martin H. Little filed Apr. 28, 1967, now U.S. Pat. No. 3,530,002 and assigned to the same assignee as the present invention.

The Little application teaches a combination of concentrated sulphuric acid gelled with boron phosphate which is prepared by mixing a concentrated sulphuric acid solution of boric acid ($H_3BO_3$) with a concentrated sulphuric acid solution of phosphoric acid ($H_3PO_4$) or its equivalent. After mixing the two solutions together, a gel forms that immobilizes the sulphuric acid. The gel is then inserted into a suitable container within the battery. Although this type of gel has been found to exhibit low synersis under controlled preparation conditions, in normal production line techniques it is more difficult to maintain the synersis at an acceptable level. Also, the gel tends to crystallize at colder temperatures and to liquefy and fragmentize if cycled through a low temperature cycling at −60° F. during storage. This liquefication and fragmentation causes the gel to become unsuitable for use in dry charged batteries that must undergo these environmental conditions.

It has been discovered that the present invention completely eliminates synersis effects even in production line techniques as well as overcoming the liquefication and fragmentation problems due to low temperature cycling. The change in the characteristics in the immobilized electrolyte has been accomplished by the discovery that heat treating the boron phosphate sulphuric acid gel to a temperature in the range of 125° to 250° C. after the gel has been formed produces a stable immobilized electrolyte suitable for use in dry charged batteries.

Briefly, the invention comprises heat treating a boron phosphate sulphuric acid gel to a temperature in the range of 125° C. to 250° C. to prevent synersis, fragmentation and crystallization of the immobilized electrolyte during storage.

In the preferred method of preparation of a gel suitable for use as an electrolyte precursor, a boric acid or equivalent boron affording substance is mixed with sulphuric acid in a first container. Next, phosphoric acid or its equivalent is mixed with sulphuric acid in a second container. Then the two solutions are mixed together and allowed to set until a gel forms which immobilizes the sulphuric acid. The gel is then heated to a temperature in the range of 125° C. to 250° C. for a predetermined length of time and then allowed to cool to room temperature.

Generally, an electrolyte precursor for use in dry charged batteries must exhibit certain characteristics in order to meet safety standards and to prevent the electrolyte from prematurely dissolving and corroding the plates before the battery is activated. In order to prevent the gel from giving off a noxious and dangerous sulphuric trioxide fumes, the concentration of the sulphuric acid solution that is mixed with the boric acid and phosphoric acid is preferably maintained at slightly less than 100% concentration sulphuric acid. Conventionally, the percentage of the concentration of sulphuric acid is given in percent of sulphuric acid in a sulphuric acid water solution. Beyond the 100% concentration level (pure $H_2SO_4$), the acid composition (oleum) is such that an appreciable vapor pressure of the sulphur trioxide ($SO_3$) is developed. Although gelation can occur with 90 percent sulphuric acid and up to 10 percent oleum the sulphur trioxide fumes generated are hazardous. Thus, a typical and practical preferred upper limit is a 99.5 percent sulphuric acid and 0.5 percent water, the oleum does not form and hence the fumes associated with the oleum are not present. However, in order to form a stable gel it is preferred that the concentration of sulphuric acid should not be less than 95 percent. A solution of less than 90 percent sulphuric acid becomes difficult to form a gel suitable for use as an electrolyte precursor as the gel does not remain dry.

In order to obtain the proper gelation of the sulphuric acid it is preferred to mix equimolar portions of boric acid or a similar boron affording substance such as boric anhydride and phosphoric acid or its equivalent. Although the precise nature of the gel formation is not thoroughly understood, it is believed that the following schematic reaction occurs to form boron phosphate.

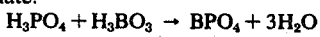

$$H_3PO_4 + H_3BO_3 \rightarrow BPO_4 + 3H_2O$$

A similar reaction occurs with related materials. As has been stated previously, the boron phosphate will gel sulphuric acid with as low as 80 percent concentration sulphuric acid and as high as 10 percent oleum but the preferred range of sulphuric acid concentration is about 95 percent to 99.5 percent sulphuric acid as the water in the solution prevents the oleum from forming, and as this composition range possesses optimum water absorption properties.

In addition to controlling the concentration of sulphuric acid, it is also necessary to control the proportion of boron phosphate that is mixed with the sulphuric acid. Gelation of sulphuric acid has occurred with one mol of boron phosphate to 10 to 400 mols of sulphuric acid solution. With the higher concentration of boron phosphates, the gelation is quite rapid and with the lower concentration of boron phosphate the gelation time is slower. Also, by lowering the temperature of the solutions of sulphuric acid and boron phosphate, one can slow down the gelation time and by heating the solutions one can speed up the gelation time.

As an illustrative preparation of a gel, a solution of 1 mol of phosphoric acid is mixed with 25 mols of 98 percent sulphuric acid solution and 1 mol of boric acid is mixed with 25 mols of 98 percent sulphuric acid solution of boric acid. The two solutions are then mixed together forming 1 theoretical mol of boron phosphate in a 50 mol solution of sulphuric acid. Typical gelation time of this mixture is two to three hours if the temperature of the solution is maintained at 25° C.

If this gel is stored at 25° C. for several weeks, even in an extremely dry atmosphere, the gel begins to develop liquid on the gel surface. This liquid is believed due at least partially to synersis. The liquid that forms on the surface is a concentrated sulphuric acid that will corrode the plates if the acid drips on the dry plates during the shelf life of the battery.

The foregoing has been a description of prior art methods and the concentration ranges of solution necessary to immobilize the sulphuric acid for use as an electrolyte precursor. The present invention comprises the additional step of taking the gel and heating it to a temperature in the range of about 125° C. to about 250° C. The heating of the gel should not be confused with the temperature at which the solutions are thoroughly mixed together to form the gel. The heat treating takes place after thorough mixing and after the gelation process. It has been discovered that heating the gel to a temperature in the range of about 125° C. to about 250° C. produces a gel that can stand indefinitely without exhibiting the undesirable surface liquid on the gel surface. Previously, work by Leicester and gelling of sulphuric acid in oleum which is reported in the *Journal of Society of Chemical Industry*, Vol. 67, pages 433–4, 1948, indicated that heating the gels having a low concentration of boron phosphate to temperatures as low as 100° C. caused breakdown of the gels. Gels with higher concentration of boron phosphate could withstand temperatures in excess of 100° C. but Leicester reported that they soon became very turbid or murky. Leicester also reported that all of his gel preparations displayed synersis to some degree.

In the present invention it was discovered that the heating of gel in the range of about 125° C. to about 250° C. did not result in permanent breakdown of the gel but produced a more stable gel that upon cooling exhibits a tendency to absorb moisture rather than to exude liquid through synersis. This makes the gel extremely useful for use as an electrolyte percursor. Because the problem of corrosion due to concentrated sulphuric acid dropping on the dry plates is eliminated, this gel acts as a drying agent within the container to absorb moisture within the container during the shelf life of the secondary cell. Obviously, this further eliminates the necessity to store the gel in an extremely dry atmosphere before the gel is activated.

Typically, heating the gel to the lower temperatures requires that the gel be maintained at the temperature for a few minutes to improve the gel water absorption characteristics while heating the gel to higher temperatures requires a shorter time before the water absorption characteristics of the gel are improved and the undesirable synersis effects are eliminated. While the temperature ranges are approximate, it has been found that if the gel is heated to about 300° C. the gel begins to break down and form a soupy solution which is unsuitable for use as an electrolyte precursor. A desirable side effect of the heat treating is that not only is the synersis eliminated but the ability of the gel to withstand temperature cycling during storage without fragmentation or liquefication of the gel is greatly improved. Tests reveal that heat treated gel can withstand temperature cycling to as low as −40° C. without crystallization and that upon heating the gel to room temperature, no liquid forms on the surface of the gel. This is opposed to an unheat treated gel which when lowered to a temperature of −25° C. crystallizes and fractionates and upon heating to room temperature forms a surface liquid on the gel.

After the heat treatment of the gel, the gel is placed in a suitable container which is located above the plates in the secondary cell. When one desires to activate the dry charged battery, a predetermined amount of water is poured into the cell which dissolves the gel thus freeing the sulphuric acid.

Because the heat treated gel exhibits no synersis effects and instead absorbs moisture, it can also be used as a drying agent. In a typical use as a drying agent the concentration of boron phosphate can be higher than the concentration of boron phosphate in use as an electrolyte precursor as there are no undesirable electrochemical side effects with phosphates in a drying agent.

A typical example of a preparation of the gel for use as a drying agent would be to mix 1 mol of a boron affording substance with 7 mols of a sulphuric acid solution and 1 mol of a phosphoric affording substance with 7 mols of sulphuric acid solution and then the two solutions mixed together to produce a theoretical 1 mol of boron phosphate to the 14 mols of sulphuric acid solution. The concentration of the sulphuric acid should preferably be less than 100 percent so as to eliminate the undesirable fumes from oleum. If solutions are mixed together at a temperature of 15° C. the gelation time is about 5 minutes. During this gelation time the gel solution can be placed, sprayed or applied to an inert support material while it is in the liquid form. After gelation the gel on the inert support material can be heat treated to act as a drying agent. If the boron phosphate sulphuric acid gel has been properly heat treated, it can absorb up to 16 percent moisture by weight during a 24 day period without developing a permanent liquescence on the surface.

If the boron phosphate sulphuric acid gel is used as in an area where the fuming sulphuric acid or oleum does not have any undesirable side effects, the boron phosphate can be mixed with a solution of 5 percent oleum which allows for greater moisture absorption by the drying agent.

We claim:

1. The method of making an electrolyte precursor suitable for use in a lead acid storage battery comprising the steps of:
   a. gelling a sulphuric acid solution with boron phosphate;
   b. heating the gel to the temperature in the range of about 125° C. to 250° C.; and
   c. cooling the gel to room temperature.

2. The method of claim 1 wherein the concentration of sulphuric acid solution is less than 100 percent sulphuric acid.

3. The method of claim 2 wherein the concentration of sulphuric acid in solution is greater than 90 percent sulphuric acid.

4. The method of claim 3 wherein the range of mols of sulphuric acid is about 20 to 200 mols per mole of boron phosphate.

5. The method of forming a boron phosphate gel drying agent in situ comprising the steps of:
   a. mixing a solution of a boron affording substance and a solution of a phosphate affording substance with a solution of sulphuric acid;
   b. applying the solution to an inert support material;
   c. allowing the solution to form a gel; and
   d. heat treating the gel and the support in the temperature in the range of about 125° C. to about 250° C.

6. The method of claim 5 wherein the solutions are mixed at a temperature of less than 20° C. to retard the gelation process during application of the solution to the inert support material.

7. The method of claim 5 wherein boron phosphate gel is prepared by mixing a first sulphuric acid solution with a member selected from the group consisting of boric acid and boric anhydride and mixing a second sulphuric acid solution with a member of the group consisting of phosphoric acid and phosphoric anhydride, then mixing the first and second solutions together to form a boron phosphate gel.

8. The method of claim 5 wherein equimolar solutions of a boron affording substance and a phosphate affording substance are mixed together.

9. The method of making a water activable lead acid storage battery comprising the steps of
   a. gelling sulphuric acid electrolyte with boron phosphate to produce an immobilized electrolyte;
   b. heat treating the immobilized electrolyte in the range of 125° C. to 250° C.;
   c. placing the immobilized electrolyte in a lead acid storage battery.

10. The method of claim 9 wherein the range of mols of sulphuric acid is about 20 to 200 mols per mol of boron phosphate.

11. The method of forming a boron phosphate drying agent comprising the steps of: mixing a solution of a boron affording substance and a solution of a phosphate affording substance with a solution of sulphuric acid; allowing the solution to form a gel; and heat treating the gel in a temperature in the range of about 125° C. to about 250° C.

12. The method of claim 11 wherein equimolar solutions of a boron affording substance and a phosphate affording substance are mixed together.

13. The method of claim 12 wherein the range of mols of sulphuric acid is about 20 to 200 mols per mol of boron phosphate.

14. A hygroscopic amorphous gel comprising sulphuric acid solution gelled with boron phosphate, said gel characterized by an affinity to absorb moisture without developing liquescence on the surface of said gel, said gel further characterized by thermal stability down to −40° C.

15. The gel of claim 14 wherein said boron phosphate comprises equimolar proportions of boric acid and phosphoric acid.

16. The gel of claim 14 wherein said gel comprises an electrolyte precursor.

* * * * *